(12) United States Patent
Hajiyev et al.

(10) Patent No.: US 10,325,145 B2
(45) Date of Patent: Jun. 18, 2019

(54) METHOD OF BENCHMARKING MEDIA CONTENT BASED ON VIEWER BEHAVIOR

(71) Applicant: REALEYES OÜ, Tallinn Harju (EE)

(72) Inventors: Elnar Hajiyev, London (GB); Martin Salo, London (GB)

(73) Assignee: REALEYES OU, Tallinn Harju (EE)

( * ) Notice: Subject to any disclaimer, the term of this patent is extended or adjusted under 35 U.S.C. 154(b) by 56 days.

(21) Appl. No.: 15/037,675

(22) PCT Filed: Nov. 18, 2014

(86) PCT No.: PCT/EP2014/074923
§ 371 (c)(1),
(2) Date: May 18, 2016

(87) PCT Pub. No.: WO2015/075035
PCT Pub. Date: May 28, 2015

(65) Prior Publication Data
US 2016/0300102 A1    Oct. 13, 2016

(30) Foreign Application Priority Data

Nov. 20, 2013   (GB) .................................. 1320485.4

(51) Int. Cl.
*G06K 9/00*     (2006.01)
*H04N 7/18*     (2006.01)
*G06Q 10/06*    (2012.01)

(52) U.S. Cl.
CPC ..... *G06K 9/00335* (2013.01); *G06K 9/00268* (2013.01); *G06K 9/00302* (2013.01); *G06Q 10/0639* (2013.01); *H04N 7/183* (2013.01)

(58) Field of Classification Search
CPC ........... G06K 9/00335; G06K 9/00268; G06K 9/00302; G06Q 10/0639; H04N 7/183
See application file for complete search history.

(56) References Cited

U.S. PATENT DOCUMENTS

| 2005/0021397 A1 | 1/2005 | Cui et al. |
| 2008/0222670 A1 | 9/2008 | Lee et al. |
| 2011/0134026 A1 | 6/2011 | Kang et al. |

(Continued)

FOREIGN PATENT DOCUMENTS

| JP | 2008-146283 A | 6/2008 |
| JP | 2010-520553 A | 6/2010 |

(Continued)

*Primary Examiner* — Huy T Nguyen
(74) *Attorney, Agent, or Firm* — Leason Ellis LLP

(57) ABSTRACT

Embodiments of the invention comprise advanced techniques for automated analysis and benchmarking of media based on behavioral data, including emotional state information, collected for a plurality of computer users exposed to that media. According to embodiments, a comparative analysis can be performed relative to other media content, in which case a rapid objective assessment tool can be provided. Alternatively or additionally, the comparative analysis can be relative to the media under test itself, in which case the technique can provide immediate feedback, e.g., on whether the media has had the intended impact on its target audience. Comparative analysis can further assist to identify audience sectors where an impact (positive or negative) is observed.

18 Claims, 7 Drawing Sheets

(56) References Cited

U.S. PATENT DOCUMENTS

| | | | |
|---|---|---|---|
| 2012/0222057 A1* | 8/2012 | Sadowsky | H04N 21/251 725/10 |
| 2013/0080242 A1* | 3/2013 | Alhadeff | G06Q 30/0239 705/14.39 |
| 2013/0110565 A1* | 5/2013 | Means, Jr. | G06Q 10/06 705/7.11 |
| 2013/0238394 A1 | 9/2013 | El Kaliouby et al. | |
| 2013/0238396 A1 | 9/2013 | Sappinen | |
| 2014/0298364 A1* | 10/2014 | Stepanov | H04N 21/25 725/10 |
| 2017/0353752 A1* | 12/2017 | Yu | H04N 21/44222 |

FOREIGN PATENT DOCUMENTS

| | | |
|---|---|---|
| JP | 2010-218491 A | 9/2010 |
| JP | 2011-505175 A | 2/2011 |
| JP | 2013-070155 A | 4/2013 |
| JP | 2013-218638 A | 10/2013 |
| WO | 2012/158234 A2 | 11/2012 |

\* cited by examiner

METHOD OF BENCHMARKING MEDIA CONTENT BASED ON VIEWER BEHAVIOR

CROSS-REFERENCE TO RELATED APPLICATIONS

This application is a U.S. National Stage Application under 35 U.S.C. § 371 of International Patent Application No. PCT/EP2014/074923, filed Nov. 18, 2014 which claims priority to Great Britain Application No. 1320485.4, filed Nov. 20, 2013, which are hereby incorporated by reference in their respective entireties.

FIELD OF THE INVENTION

The invention relates to the analysis and processing of computer user behaviour. In particular, embodiments of the invention relate to the use of information relating to a computer user's behaviour, e.g., while exposed to media content, to perform a qualitative evaluation of that media content, e.g., in comparison with other media content. The use of such qualitative comparisons allows content producers, distributors, network operators and similar entities to limit transmission of media content to only those items of media content that are of sufficient quality, thereby conserving network and computational resources.

BACKGROUND OF THE INVENTION

From a commercial viewpoint, it is important to be able to evaluate the performance of content provided online, e.g., an advertisement ("ad"), game, music video, television show, etc. In this regard, it is common to provide a system for computer users to provide feedback by manually rating content, e.g., by selecting a suitable rating value (e.g. a number of stars). It is also similarly common to provide questionnaires or interviews as part of an ad effectiveness tracking scheme.

More recently, techniques for measuring a computer user's emotions, e.g., by facial features tracking or the like, have been incorporated into methods of evaluating the performance of video content. For example, an imaging unit, such as a webcam, can be used to capture images that contain the facial features of a computer user as he or she watches video content. The captured images can be processed to yield information about the computer user's emotions at certain points in the video, which provides valuable feedback as to the performance of the video.

The video and the captured images can be transmitted over the Internet, whereby the feedback can be automatically gathered from a plurality of remote computer users. For example, US 2012/0222057 discusses a system in which a video is embedded in a web-enabled interface that is arranged to collect mental state data for a computer user who watches the embedded video. The web-enabled interface itself can be distributed, e.g., by sending an appropriate URL to a plurality of prospective viewers.

SUMMARY OF THE INVENTION

At its most general, the present invention proposes advanced techniques for automated analysis and benchmarking of a given item of media based on behavioural data, which may comprise emotional state information, collected for a plurality of computer users exposed to that given item of media. The use of such a benchmark, which is a specific exemplary qualitative comparison, allows content producers, distributors, network operators and similar entities to limit transmission of media content to only those items of media content that are of sufficient quality, e.g., possess benchmark scores in excess of a given threshold, thereby conserving network and computational resources.

The invention comprises comparative analysis and processing that can be performed relative to other media content, in which case the technique can provide a rapid objective assessment tool. Alternatively or additionally, comparative analysis can be performed relative to the media under test itself, in which case the technique can provide immediate feedback, e.g., on whether the media has had the intended impact on its target audience. Comparative analysis may further assist to identify audience sectors where an impact (positive or negative) is observed.

In a first embodiment, the present invention provides a computer-implemented method of benchmarking an impact of media content. The method according to the present embodiment comprises providing an electronic library in communication with an analysis server, the electronic library having a plurality of content entries, each of the plurality of content entries being associated with a piece of media content and including aggregated behavioural data that is expressible in terms of one or more analysis dimensions, the aggregated behavioural data being obtained from a plurality of individual behavioural data records, each individual behavioural data record being obtained from a computer user (e.g. communicated to the analysis server over a network from a remote client device) while the computer user is viewing the piece of media content (e.g. on a display associated with the remote client device).

The present embodiment further comprises receiving, in the analysis server, a plurality of new individual behavioural data records relating to a piece of media content to be analysed, each of the plurality of new individual behavioural data records being obtained from a computer user (e.g. communicated to the analysis server over a network from a remote client device) during playback of the piece of media content to be analysed, wherein each of the plurality of new individual behavioural data records includes behavioural data that is expressible in terms of the one or more analysis dimensions.

Computer readable instructions are executed in the analysis server to cause the analysis server to perform the steps of: aggregating the received plurality of new individual behavioural data records to form aggregated behavioural data for analysis; comparing, in the context of one or more of the analysis with the aggregated behavioural data of a plurality of content entries in the electronic library; identifying statistically significant similarities or differences between the aggregated behavioural data for analysis and the aggregated behavioural data of one or more of the plurality of content entries; and generating an output based on the identified statistically significant similarities or differences. The statistically significant similarities or differences serve as benchmarks for the piece of media content to be analysed relative to one or more of the plurality of content entries in the electronic library. Thus, the received data for the media under test is aggregated and compared with stored aggregated data for other media content to derive benchmark information.

A given individual behavioural data record can comprise time series data for one or more emotions expressed by the computer user. In this case, time is one of the analysis dimensions. The evolution of emotions over the duration of the media under test can thus be compared with the evolution of emotions of media as stored in the library.

The comparison can be tailored by filtering the analysis dimension through which the aggregated data for the media under test is compared, e.g., demographics (or any other kind of user data), video/media data (e.g. usage, number of views, awards), viewing conditions, collection country, etc.

The analysis server can perform the step of extracting one or more norms from the aggregated behavioural data of a plurality of content entries in the electronic library as part of or prior to the comparing step, wherein comparing the aggregated behavioural data for analysis with the aggregated behavioural data of a plurality of content entries in the electronic library comprises comparing the aggregated behavioural data for analysis with the extracted norms. The norms can be a contextual relative information to which corresponding properties of the aggregated data of the media under test can be compared.

A given norm can be calculated based on the entire content of the electronic library or on only a subset thereof. Thus, the analysis server may perform the step of sampling the electronic library to obtain aggregated behavioural data of a subset of the plurality of content entries therein, wherein the one or more norms are extracted from the aggregated behavioural data of the subset of the plurality of content entries.

Frequently utilized norms can be stored on a dedicated database ready for immediate use. Thus, the method can include storing one or more of the extracted norms in a database associated with the electronic library. Other norms can be extracted on the fly or otherwise on-demand when required by other components or steps of the present invention.

Where a given individual behavioural data record includes time series data for one or more emotions expressed by the computer user, the norms an comprise average properties for the one or more emotions in the aggregated behavioural data of a plurality of content entries in the electronic library taken over all or part of the duration of their respective media. For example, the norms can comprise any one or more of:

emotion value during all or part of the respective media;
emotion value during all or part of the respective media normalised by other emotion values;
emotion span during all or part of the respective media;
relative time of emotion peak;
number of emotion peaks;
value of highest emotion peak;
relative time of emotion trough;
number of emotion troughs;
value of lowest emotion trough;
cumulative emotion value during all or part of the respective media;
kurtosis and/or skew of time-evolution of emotion value;
duration of increase and/or decrease in the time-evolution of emotion value;
median, range and standard deviation of time-evolution of mean emotion value;
difference between maximum value and end value on the time-evolution of mean emotion value;
intercept and/or slope of linear trend based on time-evolution of mean emotion value; and
percentile distribution descriptors of mean emotion value when aggregated by time or by number of data records.

The emotions for which data is collected can comprise angry, disgusted, neutral, sad, scared, happy, surprised and their derivatives. The norms can include a correlation coefficient between the behaviour of different emotion values. Other behavioural information (e.g. physical data such as head orientation or upper body posture) may also be collected. This information can be combined with other information, e.g., emotional state information, to derive further indicators of a computer user's reaction, e.g., engagement, etc.

As indicated above, behavioural data can comprise the emotions detected from facial expressions of computer users as they view media content. Additionally or alternatively, the behavioural data may include, but is not limited to, other information that can be collected from a user that interacts with media content, e.g., any of gestures, blood pressure (e.g. based on skin colour or a monitoring accessory), blinking, etc.

Aggregated data for the media under test can be added to the electronic library, e.g., by creating a new content entry in the electronic library for the aggregated behavioural data for analysis. The norms can be recalculated after the new content entry is created in the electronic library.

The step of identifying statistically significant similarities or differences can comprise determining whether the aggregated behavioural data for analysis departs from the norms or the aggregated behavioural data of one or more of the plurality of content entries in the electronic library by an amount greater than a predetermined threshold. Alternatively, the similarities or differences can be identified based on a learnt model.

The output can be benchmark data that is indicative of the results of the comparison, e.g., by drawing attention to any significant similarities or difference from the norms. The benchmark data can be in the form of a display showing a graphical comparison of the aggregated behavioural data for analysis with the norms or with aggregated behavioural data of a plurality of content entries in the electronic library. The benchmark data or display can be used locally or can be communicated over a data network to a third party, e.g., the owner or distributor of the media under test.

By way of example, the benchmark data can be or may be used to derive a rating for media under test. In another example, the benchmark data can be used to compare the relative position of benchmark data for two or more different media items with respect to the norms. Accordingly, the output can classify media content A as creating a certain emotional response that is 10% greater than the norm than the emotional response received by media content B.

In a second aspect, the invention provides a method of intra-media comparison, e.g., an analysis of the behavioural data collected for the media under test with reference to the media itself. According to the second aspect, there is provided a computer-implemented method of analysing an impact of media content comprising: receiving, in an analysis server, a plurality of individual behavioural data records relating to a piece of media content to be analysed, each of the plurality of individual behavioural data records being obtained from a computer user during playback of the piece of media content to be analysed, wherein each of the plurality of individual behavioural data records includes behavioural data that is expressible in terms of one or more analysis dimensions.

Computer readable instructions are executed in the analysis server to cause the analysis server to perform the steps of: partitioning the received plurality of individual behavioural data records into a plurality of behavioural data analysis sub-groups, each of the plurality of behavioural data analysis sub-groups having individual behavioural data records which exhibit a predetermined property in one or more of the analysis dimensions. The behavioural data in the individual behavioural data records for each of the plurality of behavioural data analysis sub-groups is aggregated and statistically significant differences between the aggregated behavioural data of the plurality of behavioural data analysis sub-groups is identified. An output is generated based on the identified statistically significant differences, which are indicative of the relative impact of the piece of media content within the analysis dimensions.

Similar to the first aspect, the analysis server in the second aspect performs the step of extracting one or more norms from the aggregated behavioural data for the plurality of individual behavioural data records, wherein the step of identifying statistically significant differences between the aggregated behavioural data for the plurality of behavioural data analysis sub-groups comprises comparing the aggregated behavioural data of the plurality of behavioural data analysis sub-groups with the extracted norms.

The invention can also be used to automatically identify different classes of reaction to a given item of media content under test, e.g., automatically detecting one or more correlations between the behavioural data in the plurality of individual behavioural data records and the one or more analysis dimensions. Based on this detection, the systems and methods of the present invention can comprise segmenting the received plurality of individual behavioural data records into a plurality of behavioural data analysis sub-groups based on the detected one or more correlations. The detecting step can use cluster algorithms and/or spectral analysis.

BRIEF DESCRIPTION OF THE DRAWINGS

Embodiments of the invention are described below in detail with reference to the accompanying drawings, in which.

DETAILED DESCRIPTION OF CERTAIN EMBODIMENTS OF THE INVENTION

Figure 1:
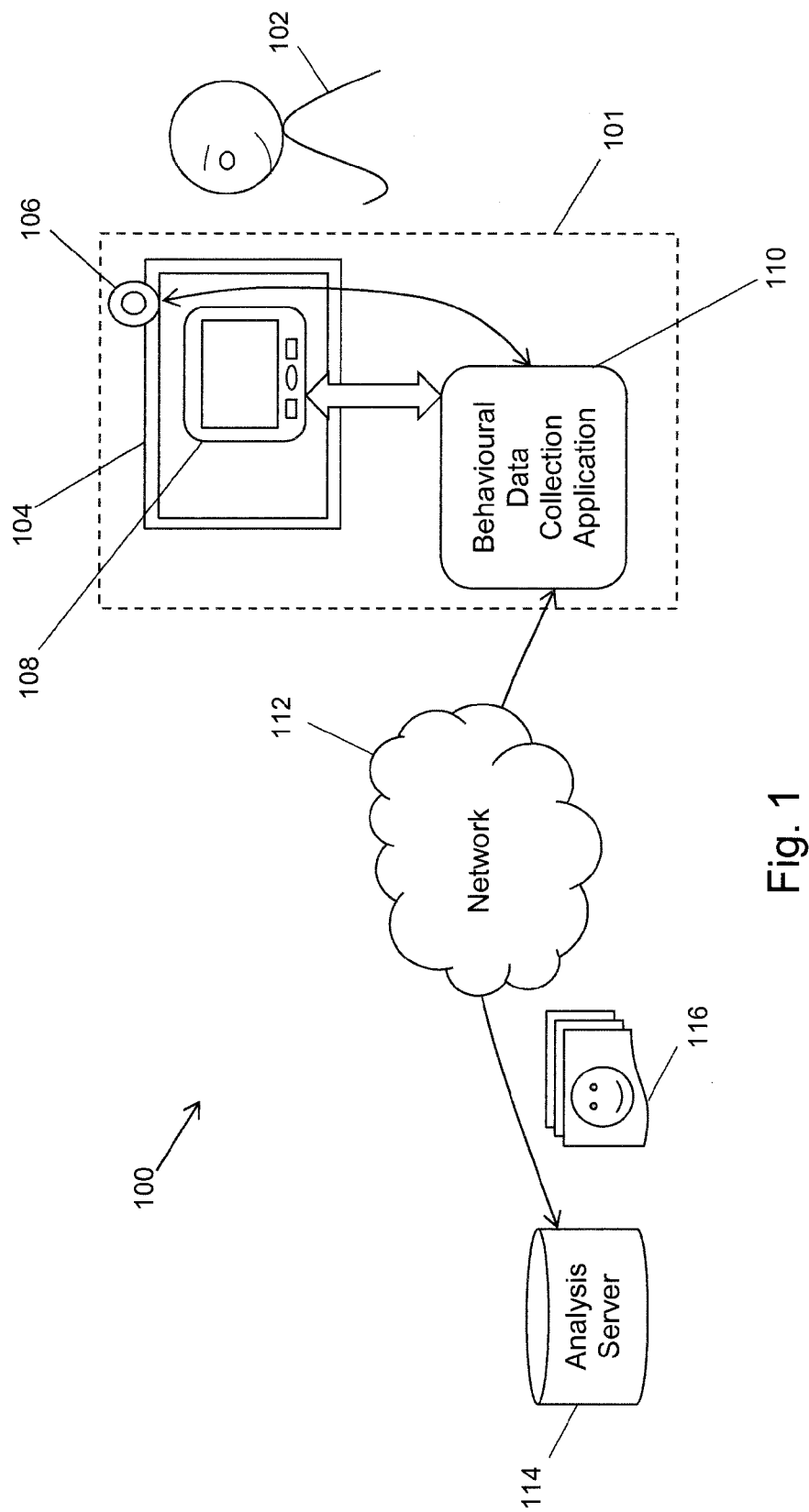
FIG. 1 is a schematic drawing of a system for implementing a method according to one embodiment of the present invention.

FIG. 1 depicts one embodiment of the environment 100 within which the present invention may operate. A user 102 views media content on a display 104 associated with a network-enabled client computing device 101, e.g., a PC, laptop computer, tablet computer, smartphone or other device capable of rendering media content, which may reside on local or remote storage devices. The client computing device 101 is thus capable of sending and receiving data over a network 112, such as the Internet.

The computing device or display therefore 104 is connected to or has inbuilt means for recording behavioural data, such as a microphone, a webcam 106, etc. As is conventional, when the user 102 wishes to view or listen to certain media content, a video player 108 (such as e.g. Windows Media Player, QuickTime Player, Audacious, Amarok, Banshee, MPlayer, Rhythmbox, SMPlayer, Totem, VLC, and xine, or an online video player, such as JW Player, Flowplayer and Brightcove) can be launched to present a user interface for playback of the media content.

The computing device has a behavioural data collection application 110 associated therewith, e.g., stored in memory thereon, downloadable or otherwise accessible via a network 112. The user 102 can receive on the computing device an invitation to participate in a behavioural data collection exercise, e.g., whilst viewing media content on the media player 108. According to certain embodiments, the behavioural data collection application is not operative to collect computer user behavioural data prior to accepting the invitation to the behavioural data collection exercise, which can be made on a one time basis or prior to the start of any given behavioural data collection exercise. Upon acceptance of an invitation, the behavioural data collection application 110 executes and can communicate with a remote analysis server 114 to execute and control the behavioural data collection exercise, as described below.

The behavioural data collection application 110 can be an emotion tracking application for collecting information indicative of the user's emotional state 116. The behavioural data collection application can also be arranged to collect other types of behavioural data. The collected behavioural data can allow the user's emotions to be tracked during the user's interaction with media played back on the video player 108.

The behavioural data collection application 110 can execute or control an initialisation process, which sets up communication between the analysis server 114 and the hardware that is operative to record behavioural data (e.g., webcam 106) to enable collected data 116 (e.g. webcam images, behavioural data, media attributes, etc.) to be transferred therebetween. For example, the initialisation process can comprise setting up (e.g., obtaining authorisation for) communication across the network 112. The collected data 116 can thus be sent over the network to the analysis server 114, where information about the user's emotions can be extracted and used for further processing. Although depicted as physically remote, the functionality of the analysis server 114 can be deployed as part of the behavioural data collection application or otherwise reside locally on the client computing device that is operative to playback the media content on the video player 108.

The present invention concerns processing at the analysis server 114 to generate information indicative of the relative quality of the media played back to the user 102 on the video player 108. The analysis server 114 is arranged to receive collected data 116 from a plurality of users, which collected data 116 can be aggregated and then compared with itself or with stored data relating to other media content to determine and output the information indicative of the relative quality of the media played back to the user 102 on the video player 108. Accordingly, the implementation of such quality control mechanisms as described and claimed herein allow for the more efficient use of limited computing and network resources by eliminating the need to use or otherwise transmit low quality media for viewing by users. Because network resources 112 are not utilized in the transmission of such low quality media, finite bandwidth is therefore freed for other uses. The output information can be displayed locally at the analysis server 114 and/or communicated over the network 112 to remote endpoints, e.g., to the user or to a third party (e.g., the owner of the media).

Figure 2:
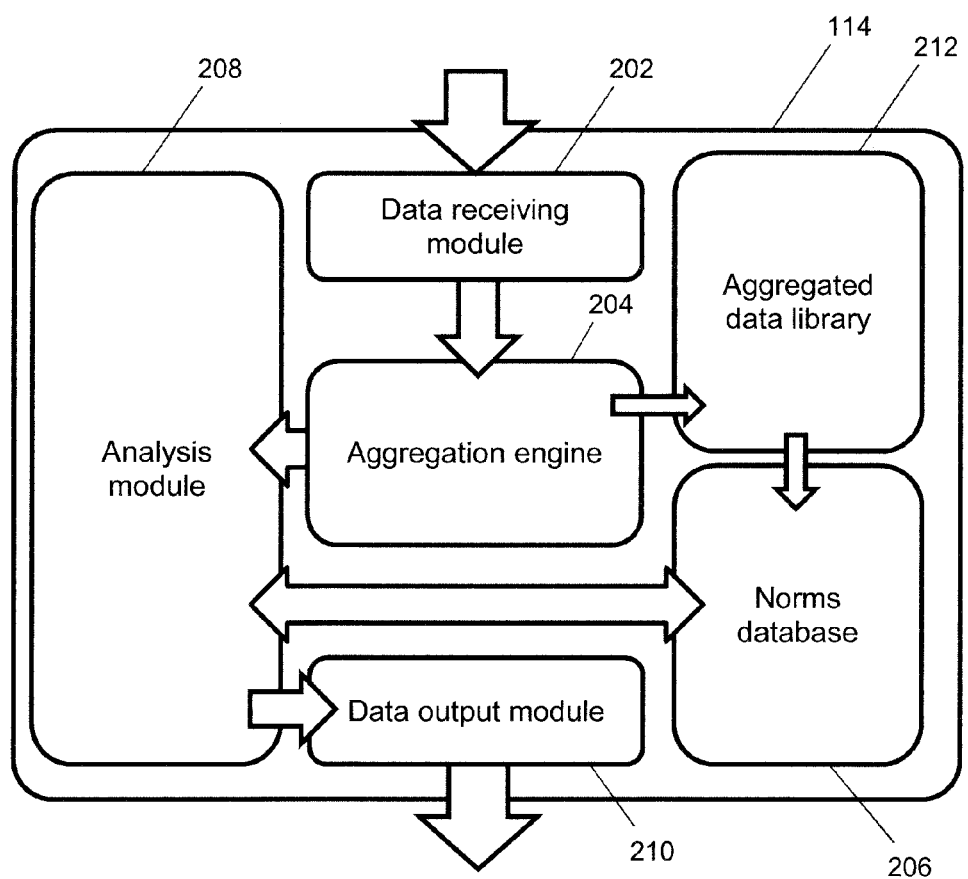
FIG. 2 is a schematic drawing of the components of an analysis server according to one embodiment of the present invention.

FIG. 2 shows a more detailed schematic view of the analysis server 114 illustrated in FIG. 1. Functional blocks are used to illustrate software and/or hardware modules that perform the processing within the server. These specialized functions may be implemented using a standard server configuration, e.g., a processor, memory and software instructions stored on the memory and executable by the processor to carry out the respective functions.

The analysis server 114 comprises a data receiving module 202 for receiving the collected data 116. The data receiving module can be operative to partition the received data into information relating to the user's behaviour and subsidiary information, e.g., information concerning the media content to which the collected data relates. For example, the identity of the media content and various attributes about the media content (e.g., duration, type, collection country) can be provided. Information relating to the user's behaviour can include, but is not limited to, information relating to a user's emotions whilst exposed to the media content, other user data, e.g., demographic data, etc.

The analysis server 114 can include an aggregation engine 204 operative to aggregate the behavioural data received from a plurality of computer users exposed to the media content under test where the collected data needs to be processed before it is ready for aggregation, e.g., to extract information about a user's emotions from the collected data (e.g. from image data). The data receiving module 202 can perform this processing, or the collected data may be sent to an analysis module 208 for processing. It should be recognized by those of skill in the art that some degree of pre-processing may occur prior to the collected data being received at the analysis server 114.

The collected behavioural data for each user can be associated with one or more analysis dimensions, e.g., features or properties of the data or user which are of interest for future analysis. For example, the time evolution of each emotion and the relationship between behavioural response and demographic information can be of interest. During aggregation, the information concerning the other analysis dimensions is also captured, whereby the aggregated data can be filtered or further manipulated using the analysis dimensions.

The aggregation engine 204 sends the aggregated data (and the associated information regarding any collected analysis dimensions) for storage in an aggregated data library 212, which can be physically remote from the analysis server 114. The aggregated data library thus stores aggregated data for a plurality of media content entries. A given media content entry can include the attribute data associated with that piece of media content. Furthermore, a given media content entry can be updated, e.g., upon receipt of an additional individual behavioural data for the given item of media content. Updating the media content entry can comprise updating the aggregated data.

The analysis server 114 can further include a norms database 206, which may also be physically remote from the analysis server 114. The norms database 206 is operative to store a plurality of benchmark norms against which a given item of media content under test can be compared to determine benchmark data. The benchmark norms can be created using information from the aggregated data library 212. The benchmark norms can be relatively basic, e.g., an average value of "surprise" emotion across all media in the aggregated data library, but can also be more complex in order to provide better benchmarking value. For example, the norms can be specific to a particular class in one or more analysis dimensions, e.g., an average emotion level exhibited by a particular demographic (e.g. gender, age) in response to the presence of a certain attribute in the media (e.g. video ads with duration less than 30 seconds). The norms database 206 can store a plurality of predetermined norms, which are immediately available (e.g., by a conventional look up technique) for comparison with media under test, or may calculate norms on the fly or otherwise on-demand when required by other components of the analysis server 114.

The aggregation engine 204 and norms database 206 are in communication with the analysis module 208, which is operative to compare the aggregated data for media under test with norms extracted from or calculated by the norms database 206. The analysis module 208 is further operative to determine benchmark data on the basis of such a comparison. The benchmark data can be output, e.g. for display or communication to a remote destination, by a data output module 210.

Figure 3:
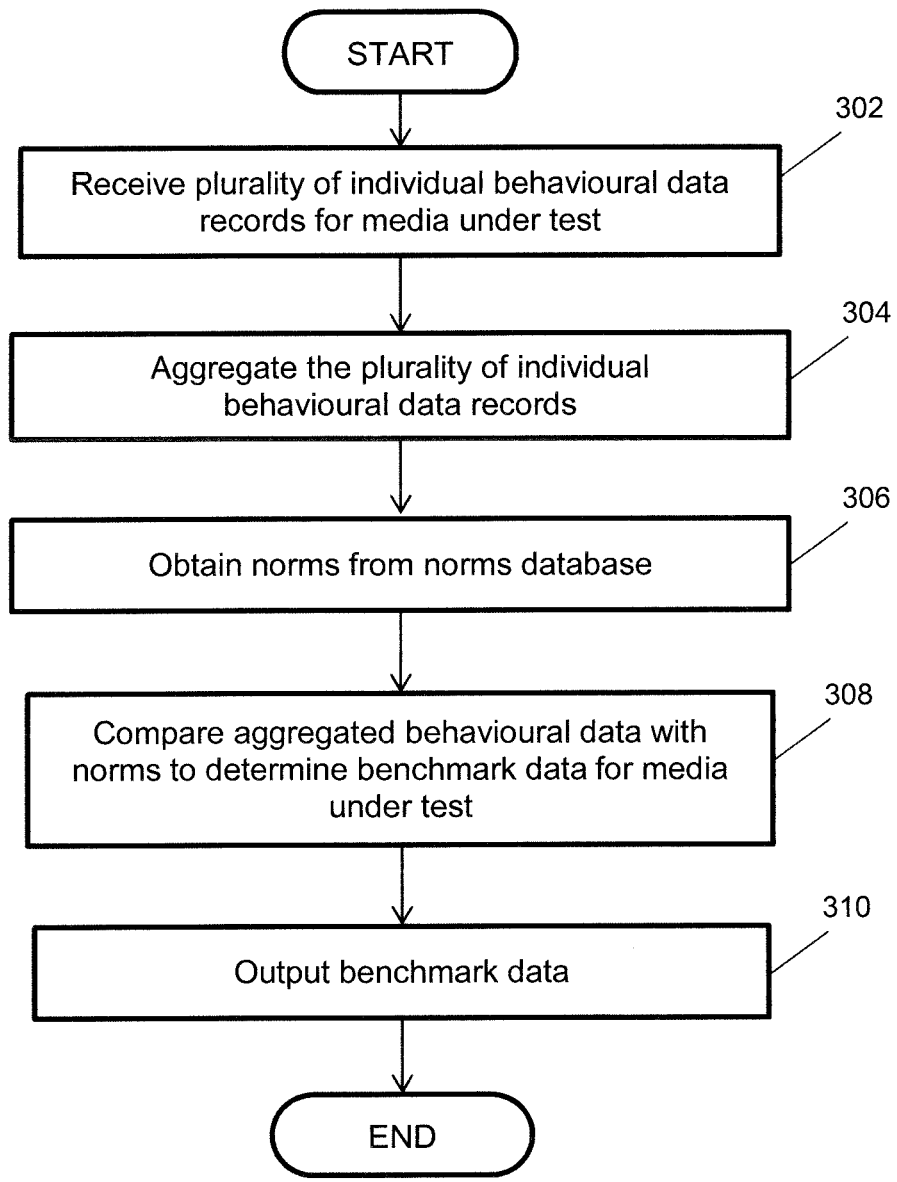
FIG. 3 is a flow chart depicting a media benchmarking process according to one embodiment of the present invention.

FIG. 3 is flow chart depicting a benchmarking method according to one embodiment of the invention. The method begins with a step 302 of receiving a plurality of individual behavioural data records for a given item of media content under test. As described above, the individual behavioural records can be received in the data input module 202 of the analysis server 114 for partitioning to separate the behavioural data from accompanying data (e.g. other user data and media attribute data). The behavioural data can be raw images, e.g., collected by user behavioural data collection components at the location where the user resides or part-processed data. Information indicative of the user's emotions whilst exposed to the media under test can be extracted from the behavioural data using conventional techniques.

After the data has been processed to extract the emotional response information, the method continues with a step 304 of aggregating the behavioural information from a plurality of users viewing the media under test to generate aggregated data for the media under test. The aggregated data can comprise the collected emotional information stored in a multi-dimensional manner in conjunction with the associated user data (e.g. demographic data) and media attribute data to permit the aggregated data to be filtered and further manipulated based on a plurality of analysis dimensions.

In order to benchmark the media under test, the method continues with a step 306 of obtaining a plurality of norms from the norms database. A given norm can represent a value associated with an emotion or a combination of emotions obtained, e.g., as an average or median value from aggregated data from a plurality of other items of media content stored in the aggregated data library. The norms can be calculated based on all of the stored media content in the aggregated media library or on only a subset of the stored pieces of media content, e.g., based on a predetermined required attribute of the media content. The norms that are obtained in step 306 can in turn be a subset of the all of the norms stored on the norms database, which can be based on attributes of the media under test.

The norms are obtained and the method continues with a step 308 of comparing the aggregated behavioural data for the media under test with the obtained norms. According to certain embodiments, this step requires filtering or manipulating the aggregated data for the media under test so that it is directly comparable with each norm. For example, one norm may relate to the emotional response of a particular gender, so the aggregated data can be filtered based on this gender before performing the comparison. Similarly, if the norm relates to an average emotional response over the duration of the media, it may be necessary to calculate this average from the aggregated data for the media under test before the comparison is performed.

The comparison step 308 is for the purpose of determining benchmark data for the media under test. Benchmark data can be obtained directly from one or more comparisons with a set of norms, e.g., as a score based on the magnitude of the difference (positive or negative) between the aggregated data response and the norms. Alternatively, the comparison can identify statistically significant similarities and/or differences between the aggregated data and norms.

The method continues with a step 310 of outputting the benchmark data. The output can be a display, e.g. a graphical representation or table listing of the benchmark data. Alternatively or additionally, the benchmark data can be transmitted to a third party, e.g. the owner of the media under test, interested in the results of the comparison. The benchmark data can be presented as a simple comparison with a set of relevant norms, e.g., "media A creates emotional response X that is Y % higher/lower than the norm". Alternatively, the benchmark data can be presented as a comparison with another media item relative to the norm, e.g., "media A creates emotional response X exceeds the norm by Y % more than media B".

In one embodiment, the benchmark data of two or more pieces of media content are compared, e.g. side-by-side, numerically or graphically, whereas other embodiments concern comparing an item of media content against itself, e.g., to judge variations in benchmark data through the duration of the media content. Advantageously, providing benchmarks allows distributors of content items to only allow those content items with high benchmarks, e.g., consistently high benchmarks, to be distributed over computer networks for access by end users, thereby eliminating the needless transmission of low benchmarked content items and conserving finite network and computing resources.

Figure 4:
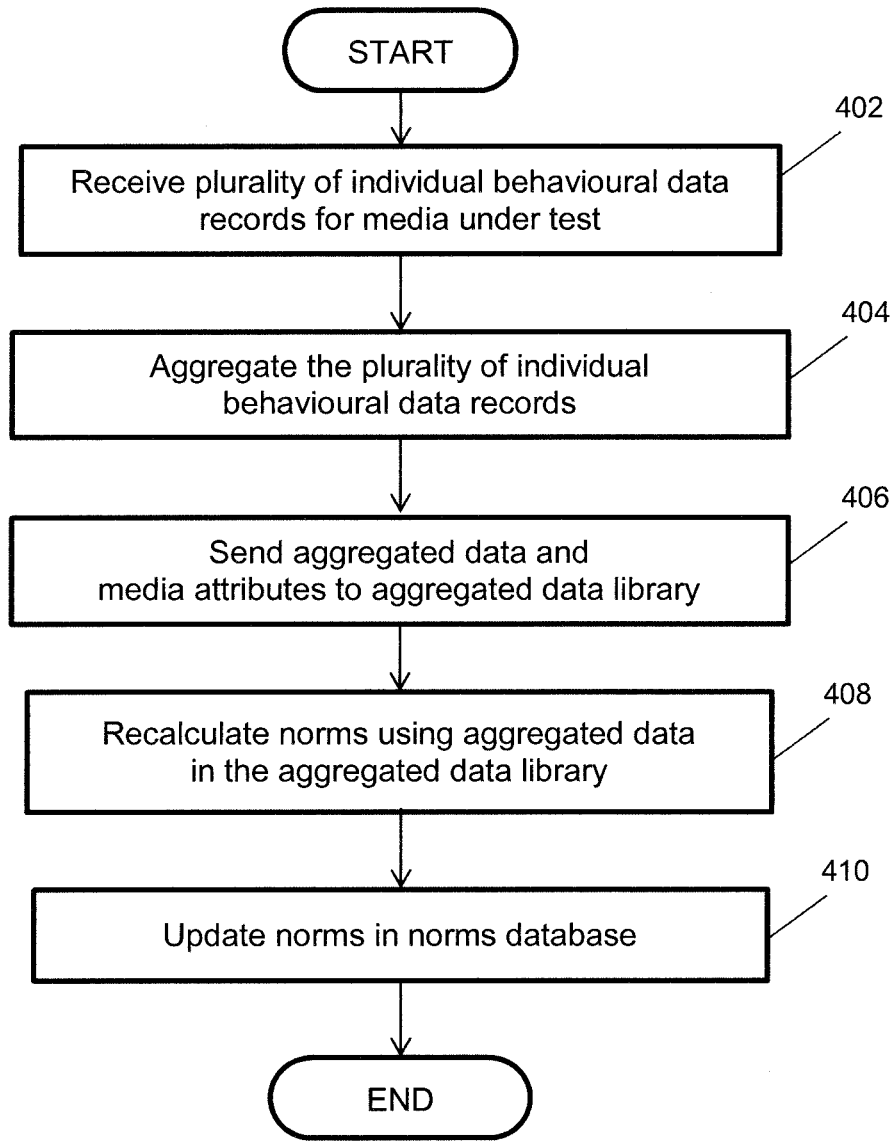
FIG. 4 is a flow chart depicting a method of updating norms in a norms library according to one embodiment of the present invention.

FIG. 4 is a flow chart depicting a method of updating the norms in the norms database according to one embodiment of the invention. The method of FIG. 4 may be performed in parallel with the method described above with reference to FIG. 3. The method of FIG. 4 begins with receiving and aggregating a plurality of individual behavioural data records for media under test, steps 402 and 404, which generally are congruent with steps 302 and 304 described above with regard to FIG. 3 and are not described again here. The method continues with a step 406, where a new content entry is made in the aggregated data library and the aggregated data and associated data (e.g. media attributes) is stored under that new content entry.

The creation of the new content entry can trigger a routine that assesses whether or not the predetermined norms stored in the norms database require updating. Alternatively, the norms database can be arranged periodically to refresh its contents from the aggregated data library. In both cases, the result is the recalculation of one or more of the norms stored in the norms database using the aggregated data in the aggregated data library following creation of the new media content entry, step 408. The method continues with an updating of the stored norms in the norms database such that the recalculated values are available for retrieval, step 410.

Figure 5:
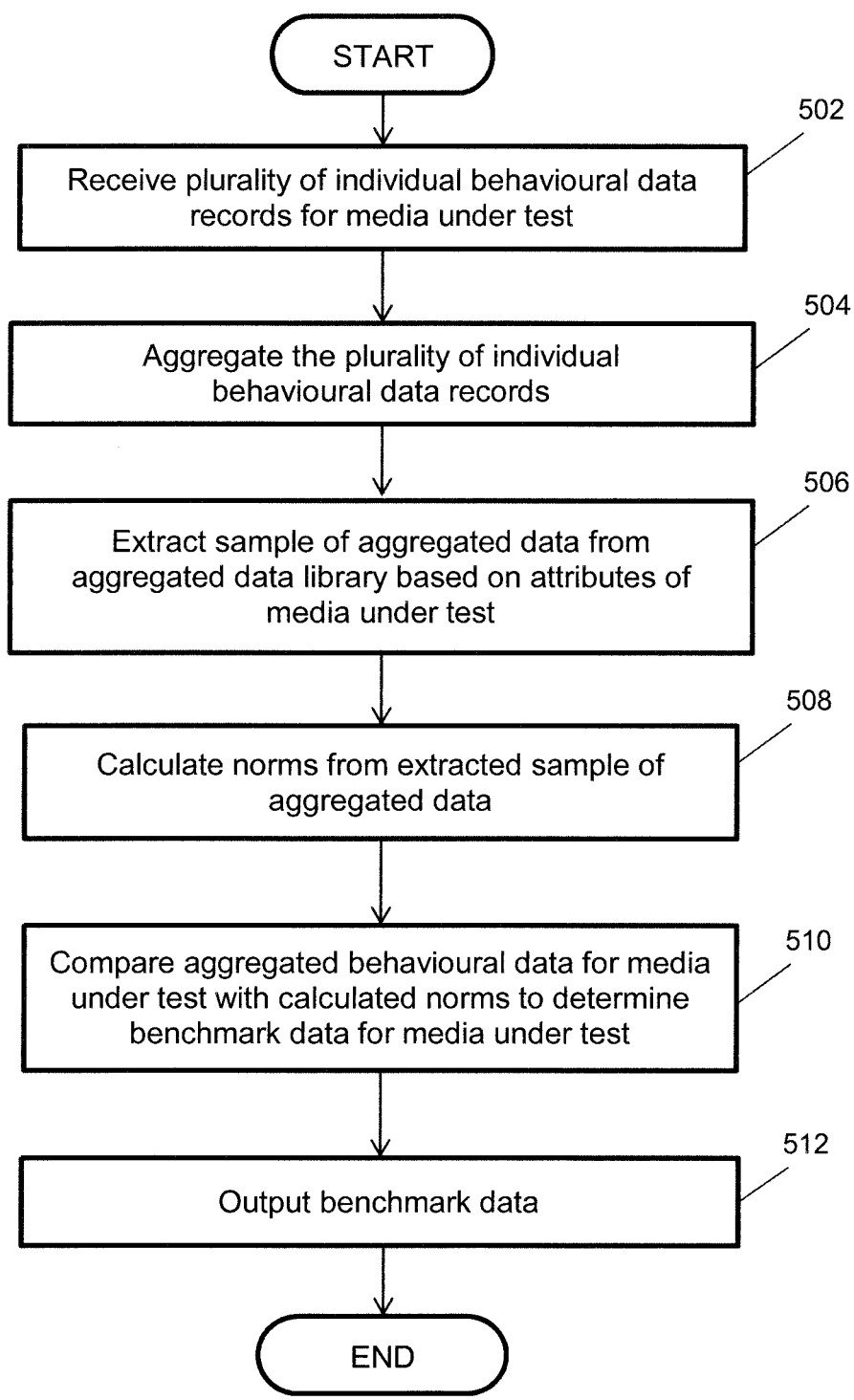
FIG. 5 is a flow chart depicting a media benchmarking process according to one embodiment of the present invention.

FIG. 5 is flow chart depicting a benchmarking method according to one embodiment of the invention. The method is similar to that shown in FIG. 3, except that the norms for comparison are generated on the fly or otherwise on demand when needed by other hardware or software components of the analysis server, rather than being looked up in a databases or other data store. The method begins of receiving and aggregating a plurality of individual behavioural data records for media under test, steps 502 and 504, which generally are congruent with steps 302 and 304 described above with regard to FIG. 3, and are not described again here.

The method continues with step 506 in which one or more samples of aggregated data are extracted from the aggregated library for the purpose of calculating a norm to be compared with the behavioural data of the media under test. The sample of aggregated data can be obtained from a subset of media content entries in the library, e.g., by filtering the media content entries based on attributes of the media, e.g. duration, content type, etc. The sample of aggregated data can also be restricted in other analysis dimensions, e.g., by demographic information, by temporal location within the video (e.g. first 10 seconds), etc. The sample can be arranged to ensure that the aggregated data belonging to the media under test is not included, e.g., in the case that a new content entry has already been created for that media.

The method continues with step 508, which comprises calculating one or more norms from the sample of behavioural data. The norms can be based on the aggregated response data for one or more emotions across the sample of data, e.g., an average or median value for surprise, happiness, etc. One or more norms can be extracted from each sample of data. At step 510, the aggregated behavioural data for the media under test is compared with the calculated norms to determine benchmark data for the media under test. This step is the generally congruent with comparison step 308 described above with regard to FIG. 3, and is not described again.

The method continues at step 512 by outputting the benchmark data. As discussed and described above, the output can be a display, e.g., a graphical representation or table listing of the benchmark data. Alternatively or additionally, the benchmark data may be transmitted over a network to a third party interested in the results of the comparison, e.g., the owner of the media under test.

Figure 6:
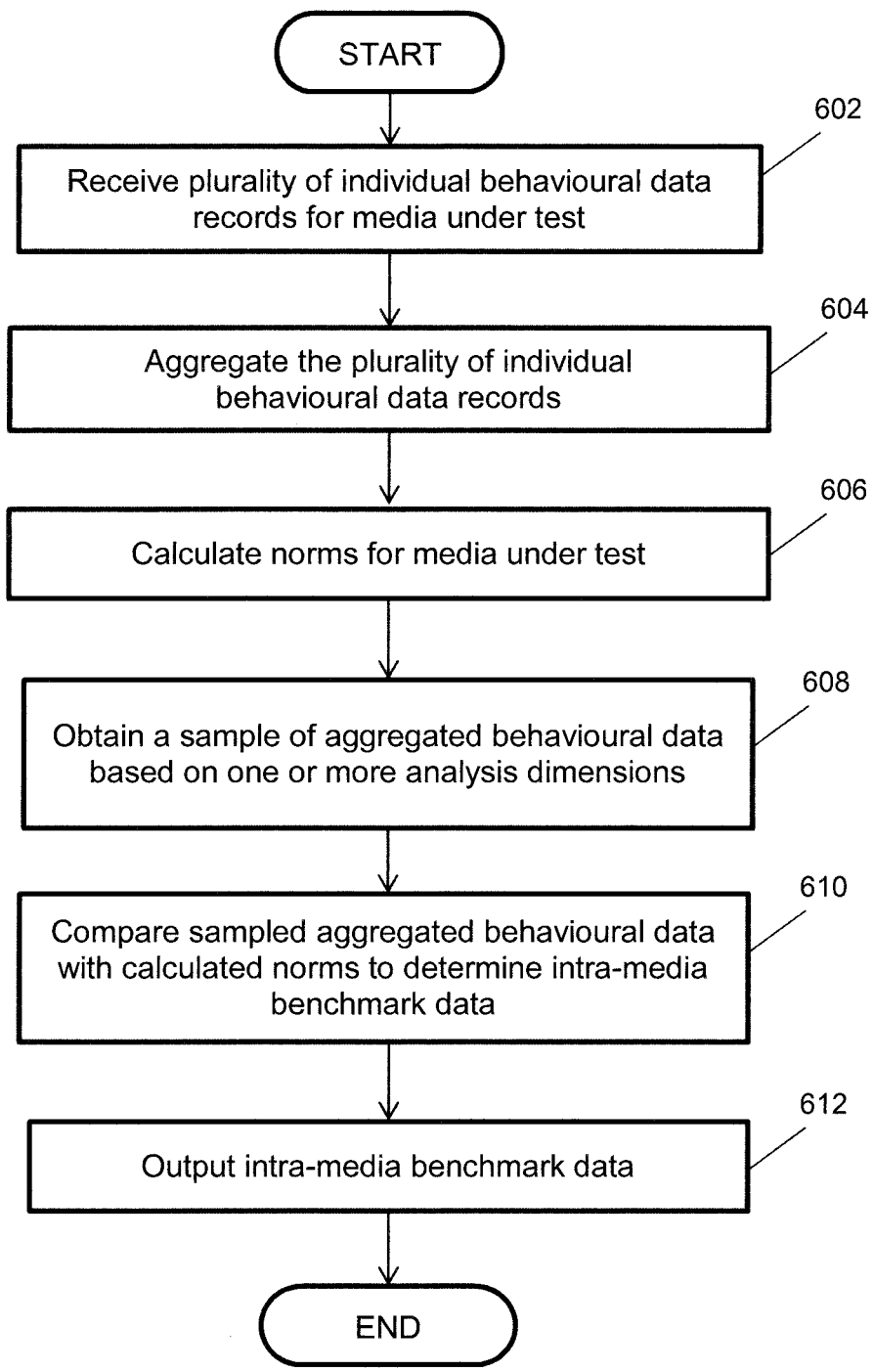
FIG. 6 is a flow chart depicting a intra-media analysis method according to one embodiment of the present invention.

FIG. 6 is flow chart depicting self-comparison technique according to one embodiment of the invention. According to the technique of FIG. 6, aggregated behaviour data for the media under test is compared with itself to identify areas of statistically significant divergence. This information can be useful in assessing the impact of the media, e.g. across different demographic groups. In this regard, network operators and content distributors can tailor the distribution of items of media content to avoid needless transmission of content, thereby conserving finite network and computational resources. The method is generally congruent with that described above with reference to FIG. 5. In accordance with FIG. 6, however, the norms are calculated from the aggregated data of the media under test, as opposed to from an aggregated data library.

The method of FIG. 6 begins with receiving and aggregating a plurality of individual behavioural data records for media under test, steps 602 and 604, which are generally congruent with steps 302 and 304 described above with regard to FIG. 3, and are not described again. The method continues with step 606, where norms for the media under test are calculated from the aggregated data obtained from the previous step 604. In one example, the norms can represent average values for one or more emotional responses taken across the duration of (or a portion thereof) the media under test. The norms can be filtered across other available analysis dimensions, e.g., demographic information.

A sample of the aggregated data is obtained for comparison with the norm. According to one embodiment, the sample is a subset of the aggregated data used to calculate the norm in order to provide for a meaningful comparison. For example, the sample can be a temporally limited extract of the aggregated data (e.g. first 10 seconds, last 5 seconds, etc.) or the result of filtering the aggregated data across another analysis dimension (e.g. age, gender). In one embodiment, the sample can be a single individual behaviour data record for the media under test.

Program flow continues at step 610 with comparing the sample of aggregated behaviour data with the norms for the media under test to determine the presence of any statistically significant differences, which can represent internally relevant or intra-media benchmark data. For example, the comparison can reveal that male viewers aged 16-25 expressed more surprise than average in the first 10 seconds of the media. At step 612, the intra-media benchmark data is output. As above, the output can be a display, e.g., a graphical representation or table listing of the benchmark data. Alternatively or additionally, the benchmark data can be transmitted to a third party, e.g. the owner of the media under test, interested in the results of the comparison. As with all exemplary transmissions described herein, transmission may be to end points co-located with the analysis server on a local network, or may be transmitted over one or more networks to reach remotely locate endpoints.

Figure 7:
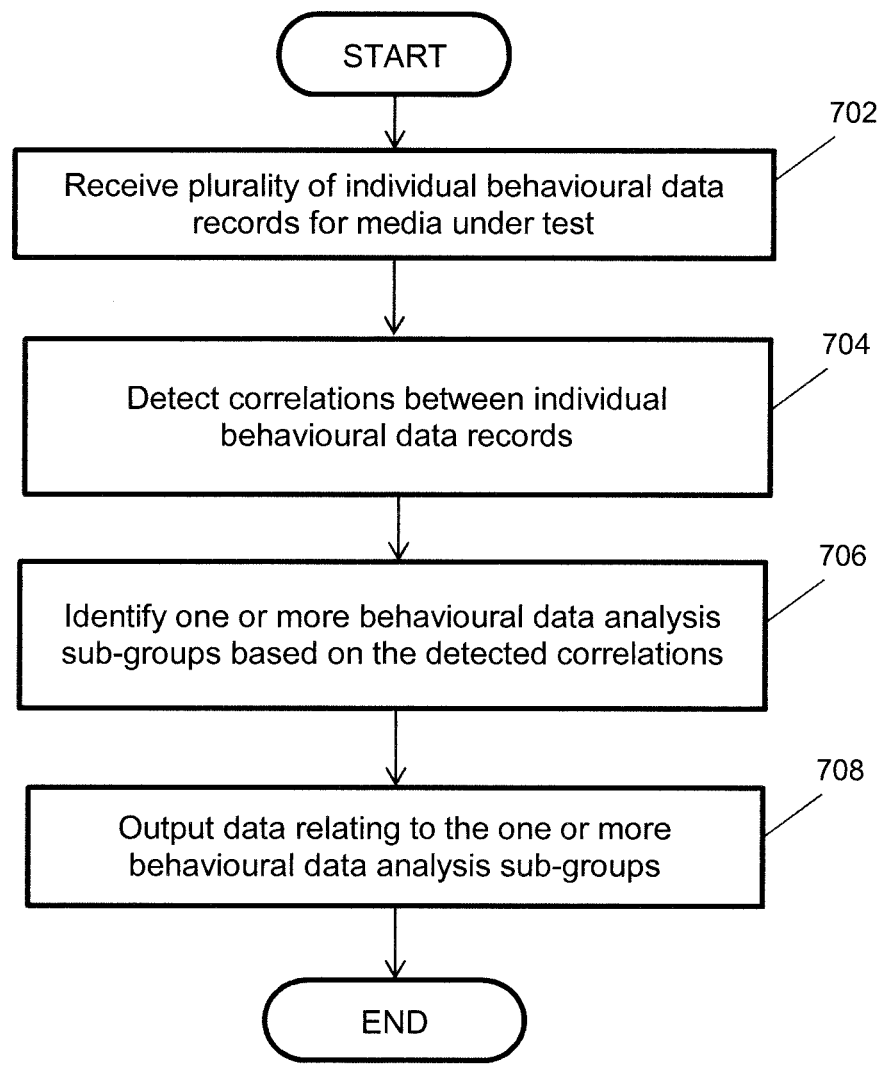
FIG. 7 is a flow chart depicting a media analysis process in which correlations between individual behaviour data records and one or more analysis dimensions are automatically detected according to one embodiment of the present invention.

FIG. 7 is flow chart depicting another self-comparison technique according to one embodiment of the invention. According to the technique of FIG. 7, the individual behavioural data records collected for the media under test are assessed to identify correlations with one or more analysis dimensions. This type of assessment can be useful as way of identifying groups of users where the impact of the media has a particular effect. In this regard, network utilization can be optimized by the transmission of media content to only those users where the impact of the media has a particular desired effect.

Program flow initializes at step 702 with the receipt of a plurality of individual behavioural data records for a given item of media under test. This step is congruent with step 302 described above with regard to FIG. 3, and is not described again. At step 704, correlations are detected between the individual behavioural data records. The detecting step detects correlations in the time evolution of one or more emotions for all or part of the duration of playback of the media content. The detecting step can use cluster algorithms and/or spectral analysis.

At step 706, a sub-group of the plurality of individual behavioural data records is allocated to an analysis sub-group based on a common correlation. For example, all individual behavioural data records that exhibit a similar happiness peak in the first quarter of the duration of the media content can be allocated to a common analysis sub-group. Program flow then continues with a step 708, wherein data relating to the sub-groups is output. The output data can relate to common properties of the sub-group, e.g., based on demographic information or other user information. As above, the output can be a display, e.g., a graphical representation or table listing of the benchmark data. Alternatively or additionally, the output data can be transmitted to a third party, e.g. the owner of the media under test, interested in the results of the comparison.

FIGS. 1 through 7 are conceptual illustrations allowing for an explanation of the embodiments of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more hardware processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

The invention claimed is:

1. A computer-implemented method of benchmarking an impact of media content, the method comprising:
    providing an electronic library in communication with an analysis server, the electronic library having a plurality of content entries, each of the plurality of content entries being associated with a piece of media content, and the electronic library storing aggregated behavioural data that is expressible in terms of one or more analysis dimensions, the aggregated behavioural data being obtained from a plurality of individual behavioural data records, each individual behavioural data record being obtained from a computer user while viewing a respective piece of media content, wherein the aggregated behavioral data relates to a plurality of different pieces of media content associated with the plurality of content entries in the electronic library;
    receiving, in the analysis server, a plurality of new individual behavioural data records relating to a piece of media content to be analysed, each of the plurality of new individual behavioural data records being obtained from a computer user during playback of the piece of media content to be analysed, wherein each of the plurality of new individual behavioural data records includes behavioural data that is expressible in terms of the one or more analysis dimensions;
    executing computer readable instructions in the analysis server to cause the analysis server to perform the steps of:
    aggregating the received plurality of new individual behavioural data records to form aggregated behavioural data for analysis;
    extracting, from the analysis server, one or more norms from the aggregated behavioral data that relates to the plurality of content entries in the electronic library;
    comparing, in the context of one or more of the analysis dimensions, the aggregated behavioural data for analysis with the extracted norms;
    identifying statistically significant similarities or differences between the aggregated behavioural data for analysis and the aggregated behavioural data of one or more of the plurality of content entries; and
    generating an output based on the identified statistically significant similarities or differences that benchmarks the piece of media content to be analysed relative to one or more of the plurality of content entries.

2. A method according to claim 1, wherein a given individual behavioural data record includes time series data for one or more emotions expressed by the computer user, and wherein the one or more analysis dimension include time.

3. A method according to claim 1, wherein the analysis server performs the step of sampling the electronic library to obtain aggregated behavioural data of a subset of the plurality of content entries therein and the one or more norms are extracted from the aggregated behavioural data of the subset of the plurality of content entries.

4. A method according to claim 1, comprising storing one or more of the extracted norms in a database associated with the electronic library.

5. A method according to claim 1, wherein a given individual behavioural data record comprises time series data for one or more emotions expressed by the computer user, and wherein the norms comprise average properties for the one or more emotions in the aggregated behavioural data of a plurality of content entries in the electronic library.

6. A method according to claim 5, wherein the average properties are selected from the group consisting of:
    emotion value during all or part of the respective media;
    emotion value during all or part of the respective media normalised by other emotion values;
    emotion span during all or part of the respective media;
    relative time of emotion peak;
    number of emotion peaks;
    value of highest emotion peak;
    relative time of emotion trough;
    number of emotion troughs;
    value of lowest emotion trough;
    cumulative emotion value during all or part of the respective media;
    kurtosis and/or skew of time-evolution of emotion value;
    duration of increase and/or decrease in the time-evolution of emotion value;
    median, range and standard deviation of time-evolution of mean emotion value;
    difference between maximum value and end value on the time-evolution of mean emotion value;
    intercept and/or slope of linear trend based on time-evolution of mean emotion value; and
    percentile distribution descriptors of mean emotion value when aggregated by time or by number of data records.

7. A method according to claim 5, wherein the one or more emotions are selected from the group consisting of: angry, disgusted, neutral, sad, scared, happy and surprised.

8. A method according to claim 5, wherein the norms comprise a correlation coefficient between different emotions.

9. A method according to claim 5, comprising creating a new content entry in the electronic library for aggregated behavioural data for analysis, and recalculating the norms after the new content entry is created.

10. A method according to claim 1, wherein the output comprises a display showing a graphical comparison of the aggregated behavioural data for analysis with the aggregated behavioural data of a plurality of content entries in the electronic library.

11. A method according to claim 1, wherein the output is transmitted out of the analysis server.

12. A method according to claim 1, wherein identifying statistically significant similarities or differences comprises determining whether the aggregated behavioural data for analysis departs from the aggregated behavioural data of one or more of the plurality of content entries by an amount greater than a predetermined threshold.

13. A method according to claim 1, wherein identifying statistically significant similarities or differences is based on a learnt model.

14. A computer-implemented method of analysing an impact of media content, the method comprising:
    providing an electronic library in communication with an analysis server, the electronic library having a plurality of content entries, each of the plurality of content entries being associated with a piece of media content, and the electronic library storing aggregated behavioural data for each of a plurality of behavioural data analysis sub-groups, the aggregated behavioural data for each behavioural data analysis sub-group being expressible in terms of one or more analysis dimensions, wherein each of the plurality of behavioural data analysis sub-groups consists of individual behavioural data records that exhibit a predetermined property in one or more of the analysis dimensions, wherein the aggregated behavioural data for each behavioural data analysis sub-group is obtained from a plurality of individual behavioural data records that belong to that behavioural data analysis sub-group, each individual behavioural data record being obtained from a computer user while viewing the piece of media content, and wherein the aggregated behavioural data for each behavioural data analysis sub-group relates to a plurality of different pieces of media content associated with the plurality of content entries in the electronic library;

receiving, in an analysis server, a plurality of new individual behavioural data records relating to a piece of media content to be analysed, each of the new plurality of individual behavioural data records being obtained from a computer user during playback of the piece of media content to be analysed, wherein each of the plurality of new individual behavioural data records comprises behavioural data that is expressible in terms of one or more analysis dimensions;

executing computer readable instructions in the analysis server to cause the analysis server to perform the steps of:

partitioning the received plurality of new individual behavioural data records into the plurality of behavioural data analysis sub-groups;

aggregating the behavioural data in the received plurality of new individual behavioural data records for each of the plurality of behavioural data analysis sub-groups;

extracting one or more norms from the aggregated behavioural data stored in the electronic library for each of the plurality of behavioural data analysis sub-groups;

identifying statistically significant differences between the aggregated behavioural data of the plurality of behavioural data analysis sub-groups by comparing the aggregated behavioural data from the received plurality of new individual behavioural data records with the extracted norms; and generating an output based on the identified statistically significant differences that is indicative of the relative impact of the piece of media content within the analysis dimensions.

15. A method according to claim 14, wherein the analysis server performs the steps of:

detecting one or more correlations between the behavioural data in the received plurality of new individual behavioural data records and the one or more analysis dimensions;

segmenting the received plurality of individual behavioural data records into the plurality of behavioural data analysis sub-groups based on the detected one or more correlations.

16. A method according to claim 15, wherein the detecting step applies cluster algorithms and/or spectral analysis.

17. A non-transitory computer program product comprising a computer readable storage medium having stored thereon computer program code, which when executed by a computing device causes the computing device to perform a method of benchmarking an impact of an item of media content, the computer program product comprising:

program code for aggregating a plurality of individual behavioural data records relating to a piece of media content to be analysed to form aggregated behavioural data for analysis;

program code for extracting one or more norms from aggregated behavioural data stored in an electronic library, wherein the aggregated behavioural data stored in the electronic library relates to a plurality of different pieces of media content associated with plurality of content entries in an electronic library;

program code for comparing, in the context of one or more analysis dimensions, the aggregated behavioural data for analysis with the extracted norms;

program code for identifying statistically significant similarities or differences between the aggregated behavioural data for analysis and the aggregated behavioural data of one or more of the plurality of content entries; and program code for generating an output based on the identified statistically significant similarities or differences that benchmark the item of media content to be analysed relative to one or more of the plurality of content entries.

18. A non-transitory computer program product comprising a computer readable storage medium having stored thereon computer program code, which when executed by a computing device causes the computing device to perform a method of analysing an impact of media content, the computer program product comprising:

program code for partitioning a plurality of individual behavioural data records into a plurality of behavioural data analysis sub-groups, wherein the plurality of individual behavioural data records relate to a piece of media content to be analysed, and wherein each of the plurality of behavioural data analysis sub-groups consists of individual behavioural data records that exhibit a predetermined property in one or more analysis dimensions;

program code for aggregating the behavioural data in the individual behavioural data records for each of the plurality of behavioural data analysis sub-groups to form aggregated behavioural data for analysis;

program code for extracting one or more norms from aggregated behvioural data that is stored in an electronic library for each of the plurality of behavioural data analysis sub-groups, wherein the stored aggregated behavioural data for each behavioural data analysis sub-group relates to a plurality of different pieces of media content associated with the plurality of content entries in the electronic library;

program code for identifying statistically significant differences between the aggregated behavioural data for analysis of the plurality of behavioural data analysis sub-groups by comparing the aggregated behavioural data for analysis with the extracted norms; and program code for generating an output based on the identified statistically significant differences which is indicative of the relative impact of the piece of media content within the analysis dimensions.

* * * * *